C. BARR.
SELF CLOSING FAUCET OR VALVE FOR LAVATORIES OR OTHER FIXTURES.
APPLICATION FILED FEB. 19, 1908.
907,951.
Patented Dec. 29, 1908.
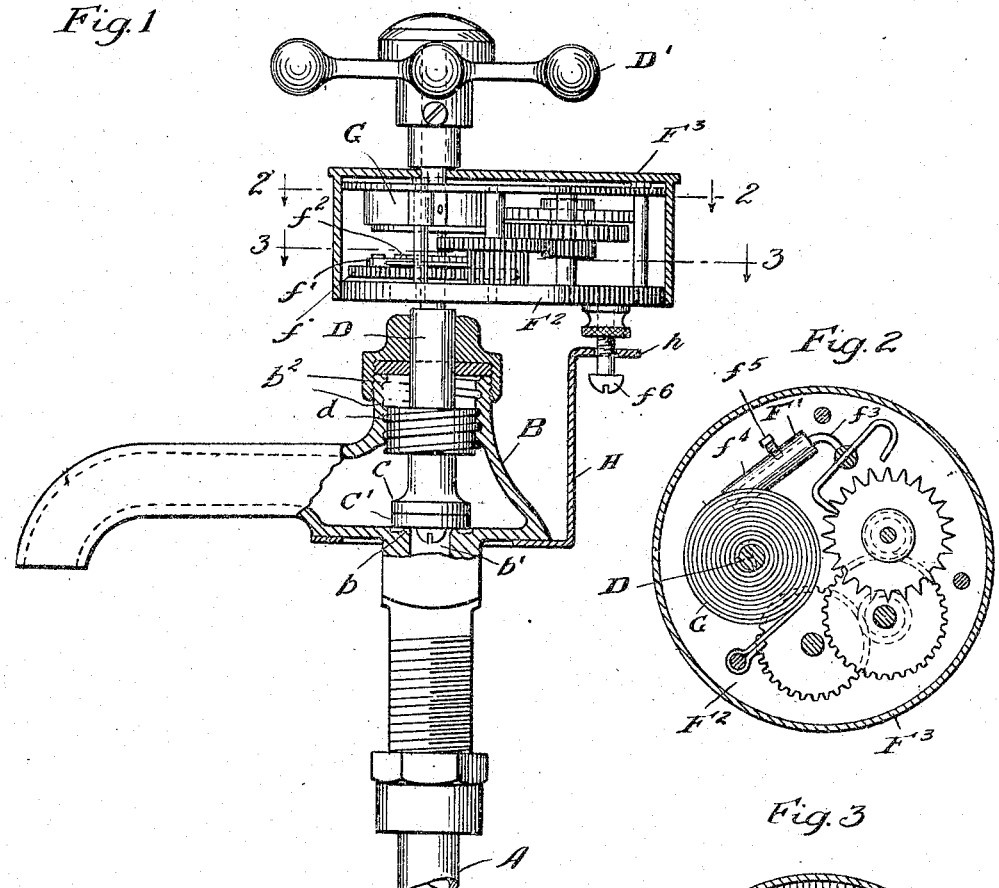
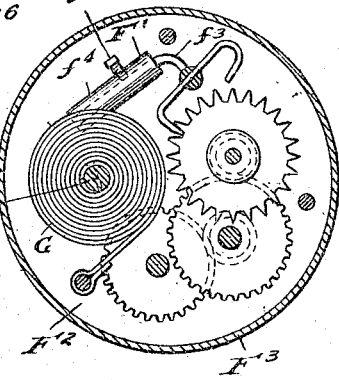
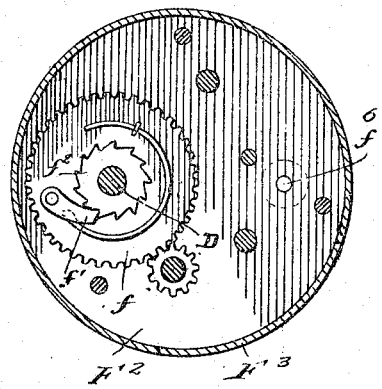
Witnesses:
Wm. Geiger
H. M. Munday
Inventor:
Carl Barr
By Munday, Evarts, Adcock & Clarke.
Attorneys

UNITED STATES PATENT OFFICE.

CARL BARR, OF CHICAGO, ILLINOIS.

SELF-CLOSING FAUCET OR VALVE FOR LAVATORIES OR OTHER FIXTURES.

No. 907,951.   Specification of Letters Patent.   Patented Dec. 29, 1908.

Application filed February 19, 1908. Serial No. 416,664.

*To all whom it may concern:*

Be it known that I, CARL BARR, a citizen of the United States, residing in Chicago, in the county of Cook and State of Illinois, have invented a new and useful Improvement in Self-Closing Faucets or Valves for Lavatories or other Fixtures, of which the following is a specification.

My invention relates to self-closing faucets, cocks or other valves for lavatories, sinks and other plumbing fixtures or devices.

The object of my invention is to provide a self-closing cock, faucet or valve, of a simple, efficient and durable construction, which will not be required to be held open while the water or other fluid is being drawn into the lavatory or other receptacle, and which will automatically close with certainty and reliability after the proper flow has been completed, and in which also the valve after being once closed will be securely held closed however great may be the pressure of the water or other fluid against which the valve is closed.

My invention consists in the means I employ to practically accomplish this object or result; that is to say it consists in the combination with the valve of the faucet, cock or other device, and the screw stem or other device for operating the valve and a spring for closing the valve or setting it to its seat, of a train of gears furnished with an escapement for controlling or regulating the movement of the train. By this combination of the valve and valve stem of the faucet, or cock with a clock movement or a time train, the period during which the valve remains open and the flow of water through the cock continues, may be regulated as desired by simply adjusting the weight in or out on the vibrating arm of the escapement; and after the spring closes the valve no amount of head or pressure which the water in the supply pipe may have, can cause the valve to open or leak as the time train effectually prevents any opening movement of the valve except by moving the valve stem through the operating handle or lever.

In the accompanying drawing forming a part of this specification, I have illustrated my invention as applied to an ordinary basin cock or faucet, this being one suitable embodiment of it and serving to illustrate its principle and mode of operation for all other uses for which it is suitable.

In said drawing Figure 1 is a side eleva-
tion, partly in vertical central section; Figs. 2 and 3 are horizontal sections on lines 2—2 and 3—3, respectively, of Fig. 1.

In the drawing A represents a water or other fluid supply pipe, B a faucet, cock, or other like valve shell or device having a valve seat $b$, and a port $b^1$ closed by the valve C. Any suitable form of valve may be employed; as illustrated in the drawing the valve is shown as one which closes against the pressure of water or other fluid in the supply pipe A, and as being provided with a gasket or packing $C^1$ to engage the valve seat.

The valve C may be operated, or opened and closed through the agency of any suitable lever, stem, or device. As shown in the drawing the valve operating means consists of a stem D having a coarse screw $d$ engaging screw threads $b^2$ on the upper portion of the valve shell B. At its upper end the valve operating rod or stem D is provided with a knob $D^1$ for turning the same.

F is a clock movement or time train, furnished with a vibrating escapement $F^1$ and a spiral spring G, secured at one end to the valve stem D and at the other end to the base plate $F^2$ of the clock movement or time train of gears, so that the action of the spring G in closing the valve will take place through the time train, and the time of closure be regulated by the time escapement. The lower gear $f$ of the time train is loose or journaled to turn on the valve stem D, and carries the pawl $f^1$ adapted to engage a ratchet $f^2$ which is fast on the valve stem D, so that when the valve stem D is turned by its handle $D^1$ to open the faucet, the spiral spring G is wound up around the valve stem and can only operate to turn the same through the time train the movement of which is regulated by the escapement $F^1$.

The escapement $F^1$ of the time train has a vibrating arm $f^3$ furnished with an adjustable weight $f^4$ which may be fixed in any position desired by a set screw $f^5$, so that the time train may be made to run slower or faster as desired to increase or diminish the period the valve remains open. Any suitable form or construction of clockwork or time train mechanism may be employed, and it may be composed of any desired number of intermeshing gears. The valve stem D extends up through a suitable hole in the base plate $F^2$ of the time train, and this base plate is prevented from turning with the valve stem by a stationary bracket H secured t    he valve shell B, or other suitable support, and having an arm $h$ through which a guide pin or screw $f^6$ on the base plate of the time train extends, this guide pin having a sliding engagement with the bracket arm $h$, so that the time train may move up and down with the valve stem.

$F^3$ is the cover or case of the clock movement or time train, the same likewise having an opening through which the valve stem extends. The time train it will be seen, is mounted upon and moved with the valve stem and valve, above and outside of the water faucet or other water delivery shell or fixture, and is inclosed by its own case or shell $F^3$, which is preferably of cylindrical form, and mounted to project chiefly to the rear of the valve stem, so that it will not be in the way or project over the lavatory or other receptacle G, into which the water is to be delivered from the water supply pipe A through the faucet or delivery shell B. The time train controlled valve regulates the period of the water flow, while not interfering with the self closing of the valve. The time train frame or base plate $F^2$ is prevented by the bracket H and guide $f^6$ from turning with the valve stem while permitting it to reciprocate up and down with the valve stem, upon which it is mounted. As the time train is mounted upon the valve stem above the faucet or water delivery device B and valve C, and as it is inclosed within its own case $F^3$, the gears and mechanism of the time train are effectually protected from water and consequent rusting or other injury.

I claim:

1. In a self-closing faucet, the combination of a valve shell through which the water is delivered, a valve fitted in the shell, a valve stem, mechanism for automatically closing the valve connected and moving longitudinally with the valve stem, an escapement connected with the said mechanism and acting to retard the operation of the same during the closing of the valve, a plate carrying the said mechanism, and a bracket on the valve shell having a sliding engagement with the said plate, substantially as set forth.

2. In a self-closing faucet, the combination of a valve shell through which the water is delivered, a valve fitted in the shell, a valve stem, mechanism for automatically closing the valve connected and moving longitudinally with the valve stem, an escapement connected with the said mechanism and acting to retard the operation of the same during the closing of the valve, a casing inclosing the said mechanism and movable longitudinally with the valve stem, and means whereby the said casing has a sliding engagement with the valve shell, substantially as set forth.

3. In a self-closing faucet, the combination of a valve shell through which the water is delivered, a valve fitted in the shell, a valve stem, mechanism at the rear of the stem for automatically closing the valve, the said mechanism being connected and movable longitudinally with the valve stem, an escapement connected with the said mechanism and acting to retard the operation of the same during the closing of the valve, a plate carrying the said mechanism and extending to the rear of the faucet, and a bracket at the rear of and attached to the shell and having a sliding connection with the said plate, substantially as set forth.

4. In a self-closing faucet, the combination of a valve shell, a valve fitted in the shell, a valve stem, a spring connected with the stem for automatically closing the valve, an escapement and gearing connected with the stem for controlling and retarding the operation of the same in closing the valve, a casing carrying and inclosing the said spring, gearing and escapement, and a bracket on the valve shell having a sliding engagement with the casing, substantially as set forth.

CARL BARR.

Witnesses:
H. M. MUNDAY,
EDMUND ADCOCK.